United States Patent
Sandey et al.

(10) Patent No.: US 12,420,603 B2
(45) Date of Patent: Sep. 23, 2025

(54) SYSTEM AND METHOD FOR AN AGRICULTURAL VEHICLE

(71) Applicant: CNH Industrial America LLC, New Holland, PA (US)

(72) Inventors: Mitchell Sandey, Manitowoc, WI (US); Roy A. Bittner, Reedsville, WI (US)

(73) Assignee: CNH Industrial America LLC, New Holland, PA (US)

( * ) Notice: Subject to any disclaimer, the term of this patent is extended or adjusted under 35 U.S.C. 154(b) by 121 days.

(21) Appl. No.: 17/990,103

(22) Filed: Nov. 18, 2022

(65) Prior Publication Data

US 2024/0166004 A1    May 23, 2024

(51) Int. Cl.
*B60G 3/02*      (2006.01)

(52) U.S. Cl.
CPC .......... *B60G 3/02* (2013.01); *B60G 2300/083* (2013.01); *B60G 2500/30* (2013.01)

(58) Field of Classification Search
CPC . B60G 3/05; B60G 2300/08; B60G 2400/252
See application file for complete search history.

(56) References Cited

U.S. PATENT DOCUMENTS

| | | | |
|---|---|---|---|
| 6,029,764 A * | 2/2000 | Schubert | F16F 15/0275 296/190.07 |
| 7,845,652 B2 | 12/2010 | Iwami et al. | |
| 9,079,470 B2 | 7/2015 | Slawson | |
| 9,180,747 B2 | 11/2015 | Slawson | |
| 9,688,113 B2 | 6/2017 | Ruppert | |
| 9,950,584 B2 | 4/2018 | Slawson | |
| 10,183,542 B1 | 1/2019 | Bittner et al. | |
| 10,245,915 B2 | 4/2019 | Kerner et al. | |
| 10,436,622 B2 | 10/2019 | Bittner et al. | |
| 10,556,476 B2 | 2/2020 | Dames et al. | |
| 10,730,359 B2 | 8/2020 | Bittner et al. | |
| 2015/0224845 A1 * | 8/2015 | Anderson | F03G 7/08 701/37 |
| 2017/0137023 A1 * | 5/2017 | Anderson | B60W 10/20 |
| 2019/0178695 A1 * | 6/2019 | Bittner | G01F 1/86 |
| 2022/0105767 A1 | 4/2022 | Short | |

FOREIGN PATENT DOCUMENTS

WO    WO 2022/043780 A1    3/2022

* cited by examiner

*Primary Examiner* — Long T Tran
(74) *Attorney, Agent, or Firm* — Dority & Manning, P.A.

(57) ABSTRACT

A suspension control system can include a chassis and one or more wheel assemblies. One or more suspension assemblies can be respectively coupled to the one or more wheel assemblies. A computing system can be communicatively coupled to one or more position sensors and one or more orientation sensors. The computing system can be configured to actuate the actuator of the one or more suspension assemblies to define a stroke, determine a default stroke position based on data from the one or more position sensors, and define a default position of the chassis based on data from the one or more orientation sensors.

20 Claims, 6 Drawing Sheets

SYSTEM AND METHOD FOR AN AGRICULTURAL VEHICLE

The present disclosure generally relates to agricultural vehicles and, more particularly, to systems and methods for operating a suspension system of the agricultural vehicle.

BACKGROUND

Agricultural vehicles may perform various tasks within an agricultural ground surface. For example, an applicator (e.g., sprayers, floaters, etc.) can deliver an agricultural product to a ground surface of a ground surface. However, other agricultural vehicles may perform other tasks. During the operation of the agricultural vehicle, a suspension system may dampen the movement of the vehicle or a component thereof. For instance, the suspension system may be configured to isolate the cab and/or a boom assembly from vibrations caused by uneven terrain. Accordingly, an improved system and method for operating the suspension system of the agricultural vehicle would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a suspension control system that includes a chassis and one or more wheel assemblies. One or more suspension assemblies are respectively coupled to the one or more wheel assemblies. Each of the one or more suspension assemblies is moveable between a first position and a second position through actuation of an actuator. One or more position sensors is configured to capture data indicative of a position of the actuator within each of the one or more suspension assemblies. One or more orientation sensors is configured to capture data indicative of an orientation of the chassis. A computing system communicatively coupled to the one or more position sensors and the one or more orientation sensors. The computing system is configured to actuate the actuator of the one or more suspension assemblies to define a stroke, determine a default stroke position based on data from the one or more position sensors, and define a default position of the chassis based on data from the one or more orientation sensors.

In some aspects, the present subject matter is directed to a method for an operating an agricultural vehicle. The method includes actuating an actuator to alter a position on a suspension assembly between a minimum height and a maximum height. The method also includes capturing data, from one or more position sensors, indicative of a minimum actuator position with the actuator at the minimum height and a maximum actuator position with the actuator at the maximum height and determining, with a computing system, a default stroke length. The method further includes placing the actuator at a defined position along the default stroke length. in addition, the method includes capturing data, from one or more orientation sensors, indicative of an orientation of a chassis with the actuator at the defined position. Lastly, the method includes determining, with the computing system, a default position of the chassis based on the data from the one or more orientation sensors.

In some aspects, the present subject matter is directed to a suspension control system that includes a chassis and one or more wheel assemblies. One or more suspension assemblies are respectively coupled to the one or more wheel assemblies. Each of the one or more suspension assemblies is moveable between a first position and a second position through actuation of an actuator. One or more position sensors are configured to capture data indicative of a position of the actuator within each of the one or more suspension assemblies. One or more height sensors are configured to capture data indicative of a height of the chassis. A computing system is communicatively coupled to the one or more position sensors and the one or more height sensors. The computing system is configured to actuate the actuator of the one or more suspension assemblies to define a stroke, determine a default stroke position based on data from the one or more position sensors, and determine a height of the chassis relative to a ground surface with the chassis in the default position.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
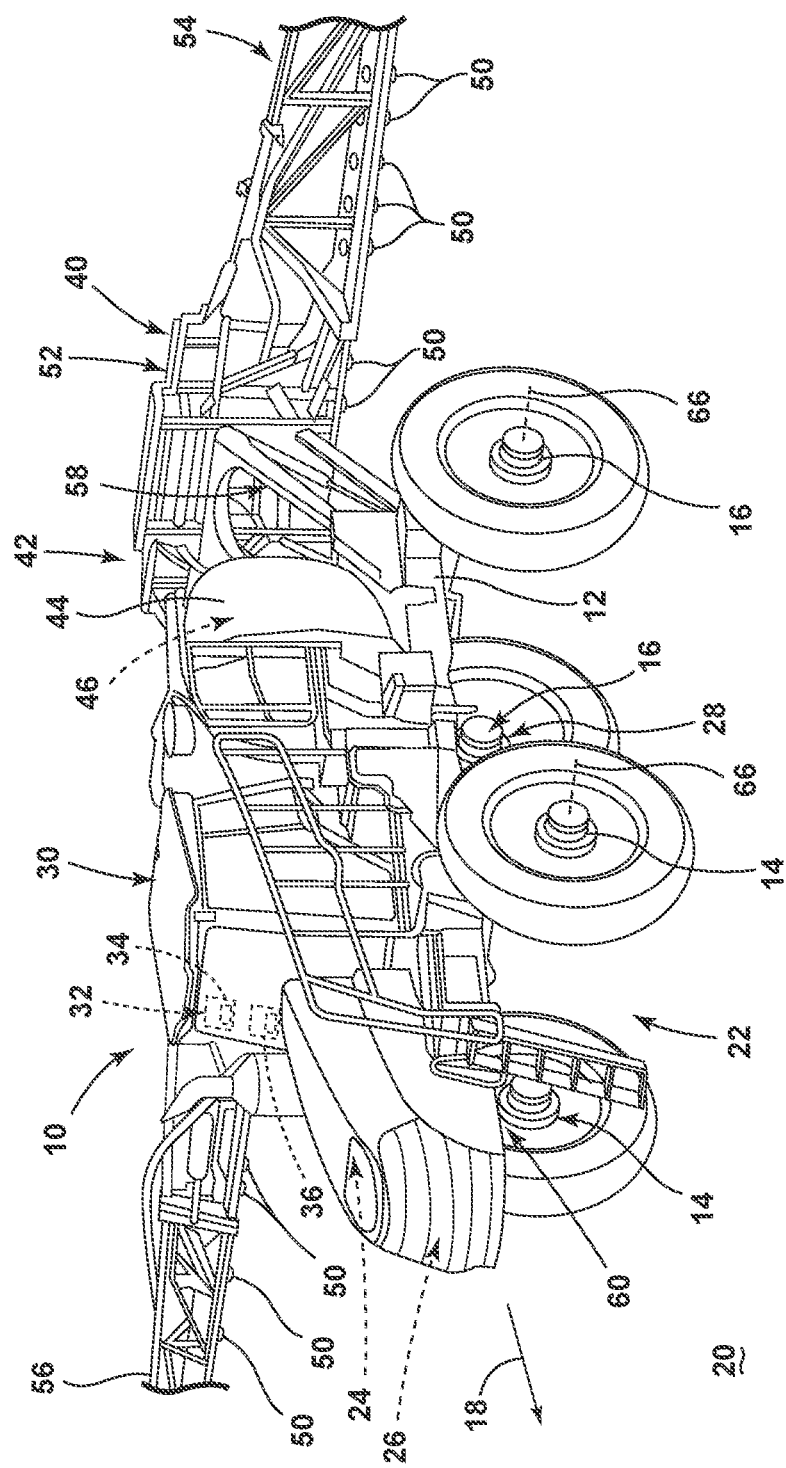
FIG. 1 illustrates a perspective view of an agricultural work vehicle in accordance with aspects of the present subject matter.

Repeat use of reference characters in the present specification and drawings is intended to represent the same or analogous features or elements of the present technology.

DETAILED DESCRIPTION

Reference now will be made in detail to examples of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another example to yield a still further example. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a suspension control system that can include a chassis and one or more wheel assemblies. One or more suspension assemblies can be respectively coupled to the one or more wheel assemblies. Each of the one or more suspension assemblies is moveable between a first position and a second position through actuation of an actuator.

One or more position sensors can be configured to capture data indicative of a position of the actuator within each of the one or more suspension assemblies. One or more orientation sensors can be configured to capture data indicative of an orientation of the chassis. One or more one or more height sensors can be configured to determine a height of the chassis relative to a ground surface with the chassis in the default position.

In operation, each of the suspension assemblies may be placed at a first default stoke thereby defining a first default position. At various times, the computing system may instruct each of the suspension assemblies to calibrate the suspension assembly. In such instances, the computing system may instruct each suspension assembly to move to a minimum height position and a maximum height position, such as by moving a piston rod to a fully retracted position and a fully extended position. The position sensor associated with each respective suspension assembly may be configured to generate data indicative of a position of the corresponding piston rod with respect to the base when the piston is moved between the minimum height position and the maximum height position, corresponding to the stroke. For example, if the position sensor provides data indicating that the piston rod has a movement length of about x inches, the piston rod could be set to a default stroke which is a midpoint of x/2 inches.

Once each of the suspension assemblies is placed at its default stroke, the computing system can define a second default position of the vehicle based on the data from the one or more orientation sensors. Additionally, in some cases, the computing system may recalculate a second height of one or more components from the ground surface once the second default position is defined by the computing system. The second height may be varied from a first height of the vehicle prior to the recalibration of one or more suspension assemblies. For example, the computing system may calculate the second height of the chassis relative to one or more rolling axes and/or the ground surface. Additionally or alternatively, the computing system may calculate a second height of the boom assembly relative to the ground surface. One or more spraying operations may then be updated based on the second height of the vehicle relative to the ground surface. A calibrated orientation of the vehicle maintains approximately constant weight distribution among the wheels and the tires. This, in turn, reduces overall soil compaction, reduces injury to crop roots, and improves tractive effort when low soil adhesion conditions exist, such as under muddy conditions.

Figure 2:
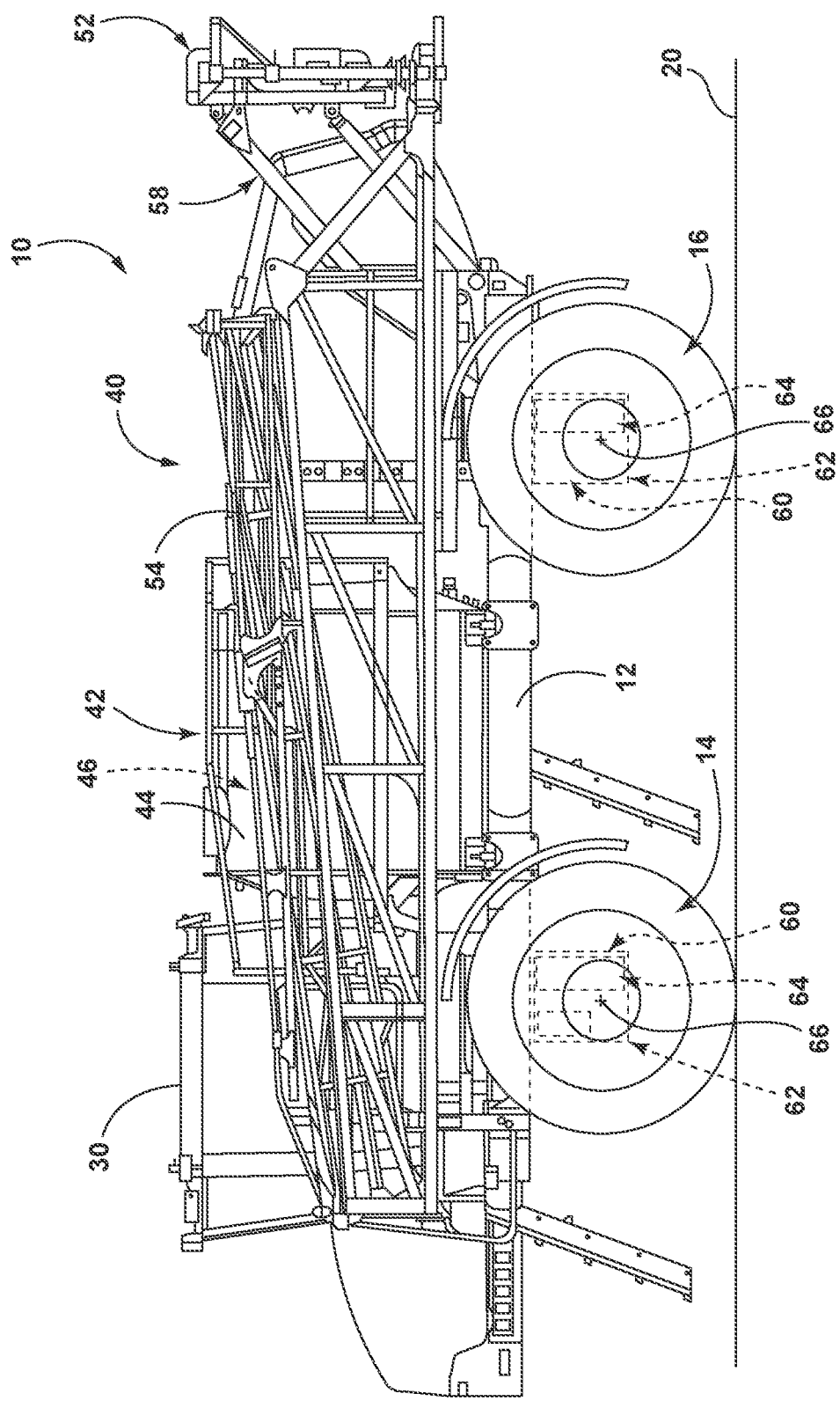
FIG. 2 illustrates a side view of the work vehicle in accordance with aspects of the present subject matter.

Referring now to FIGS. 1 and 2, a work vehicle 10 is generally illustrated as a self-propelled agricultural applicator. However, in alternate examples, the work vehicle 10 may be configured as any other suitable type of work vehicle 10 configured to perform any agricultural operation, such as a tractor, harvester, or another vehicle.

In various examples, the work vehicle 10 may include a chassis 12 configured to support or couple to a plurality of components. For example, the chassis 12 can include front and rear wheel assemblies 14, 16 that are operably coupled to a chassis frame. The wheel assemblies 14, 16 may be configured to support the work vehicle 10 relative to a ground surface 20 and move the work vehicle 10 in a direction of travel (e.g., as indicated by arrow 18 in FIG. 1) across the ground surface 20. In this regard, the work vehicle 10 may include a powertrain control system 22 that includes a power plant 24, such as an engine, a motor, or a hybrid engine-motor combination, a hydraulic propel or transmission system 26 configured to transmit power from the engine to the wheel assemblies 14, 16, and/or a brake system 28.

The chassis 12 may support a cab 30, or any other form of user's station, for permitting the user to control the operation of the work vehicle 10. For instance, the work vehicle 10 may include a user interface 32 including a display 34 for providing messages and/or alerts to the user and/or for allowing the user to interface with the vehicle's controller through one or more user input devices 36 (e.g., levers, pedals, control panels, buttons, and/or the like) within the cab 30.

A boom assembly 40 may also be mounted to the chassis 12. In addition, the chassis 12 may support a product application system 42 that includes one or more tanks 44, such as a product tank and/or an auxiliary tank. The tank 44 is generally configured to store or hold an agricultural product 46, such as a pesticide, a fungicide, a rodenticide, a nutrient, and/or the like. The agricultural product 46 is conveyed from the tank 44 through a flow control assembly 48 including plumbing components, such as interconnected pieces of tubing, for release onto the underlying ground surface 20 (e.g., plants and/or soil) through one or more nozzle assemblies 50 mounted on the boom assembly 40.

As shown in FIGS. 1 and 2, the boom assembly 40 can include a frame 52 that supports first and second boom arms 54, 56, which may be orientated in a cantilevered nature. In some instances, a boom assembly 40 may be positioned between the frame 52 and the chassis 12. The first and second boom arms 54, 56 are generally movable between an operative or unfolded position (FIG. 1) and an inoperative or folded position (FIG. 2). When distributing the product, the first boom arm 54 and/or the second boom arm 56 extends laterally outward from the work vehicle 10 to cover swaths of the underlying ground surface 20, as illustrated in FIG. 1. However, to facilitate transport, each boom arm 54, 56 of the boom assembly 40 may be independently folded forwardly or rearwardly into the inoperative position, thereby reducing the overall width of the vehicle 10, or in some examples, the overall width of a towable implement when the applicator is configured to be towed behind the work vehicle 10.

In some examples, to improve the agricultural product application quality and/or operator comfort, the vehicle 10 can be equipped with a passive, semi-active, or active suspension system 60. In various examples, the suspension system 60 may be configured to isolate the cab 30 and/or a boom assembly 40 from vibrations caused by uneven terrain. For instance, the suspension system 60 can include vibration isolators mounted between the chassis 12 and the wheel assemblies 14, 16 of the vehicle 10. For example, the suspension system 60 can be configured as a passive system that uses passive vibration isolators (e.g., rubber isolators, springs with friction, air bags, or viscous dampers) to dampen vibrations with different isolators to dampen different frequencies. Additionally or alternatively, the suspension system 60 can be configured as a semi-active system to achieve control and isolation between the chassis 12 and the cab 30 and/or the boom assembly 40 by controlling a damper to selectively remove energy from the system in response to the movement of the cab 30/boom assembly 40 (e.g., as monitored via sensors). Additionally or alternatively, the suspension system 60 can be configured as an active system that uses one or more sensors to sense movement and an associated controller or computing system to generate control signals for an actuator that applies a force to the cab 30 and/or the boom assembly 40 to cancel vibrations transmitted to the cab 30/boom assembly 40 by the chassis 12.

In some examples, the suspension system 60 may be adjustable thereby allowing for the height of the vehicle 10 above the ground surface 20 to be adjusted through respective suspension assemblies 62. In some instances, the suspension system 60 may include respective actuators 64 (e.g., an extensible strut, a cylinder, etc.) for connecting each of the four ground-engaging wheel assemblies 14, 16 of the vehicle 10 to the chassis 12 of the vehicle 10. The actuator 64 can control the height of the vehicle 10 above the ground surface 20 by regulating a flow of pressurized fluid (e.g., liquid, air, gas, etc.) to the actuator 64 to thereby control the extension/retraction of the actuator 64 and a vertical distance between a rolling axis 66 of the wheel assemblies 14, 16 and the chassis 12 of the vehicle 10.

Figure 3:
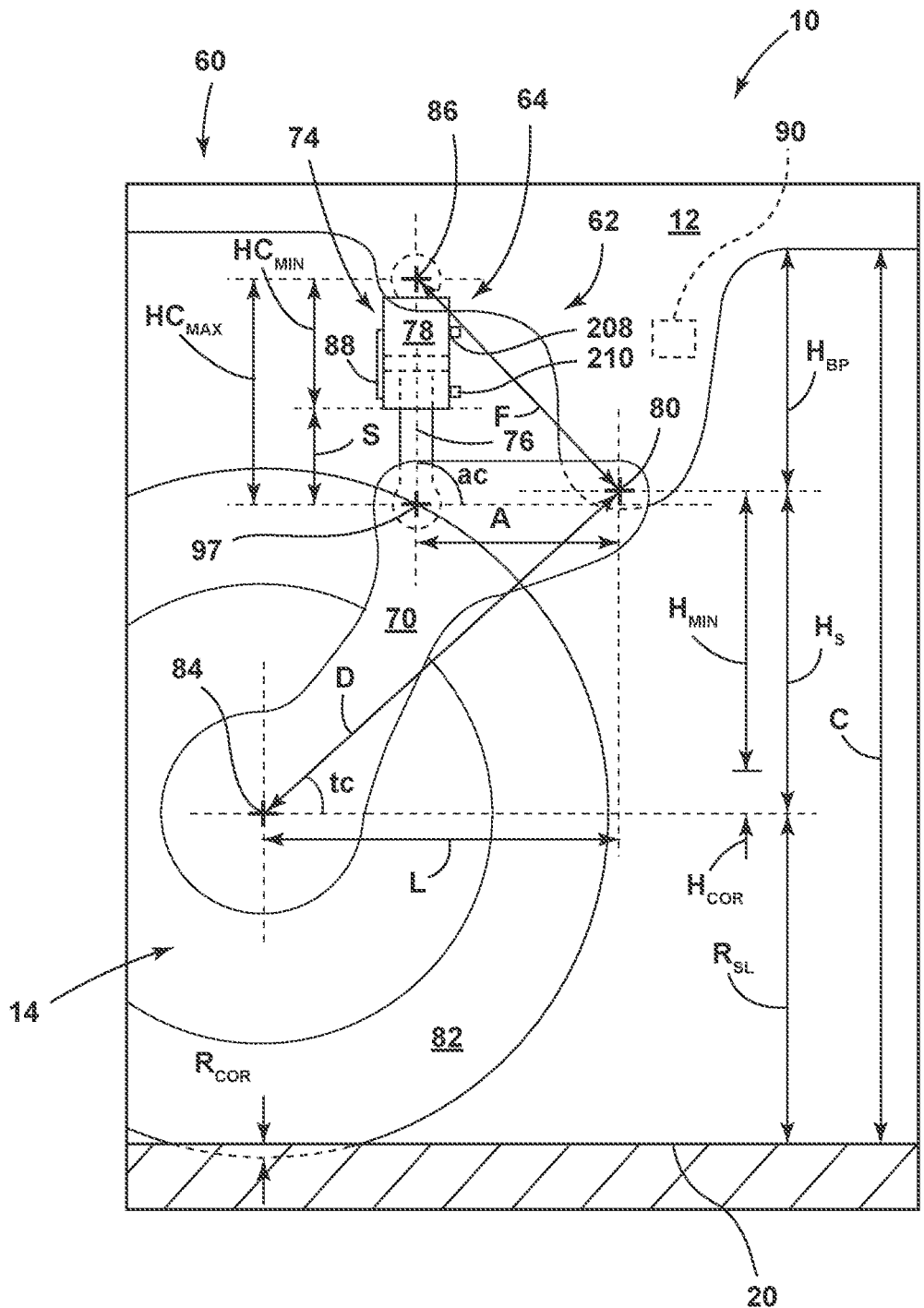
FIG. 3 is a schematic view of a vehicle suspension system in accordance with aspects of the present subject matter.

Referring now to FIG. 3, the suspension system can include respective suspension assemblies 62 each corresponding to a respective wheel assembly 14, 16 of the vehicle 10. One suspension assembly 62 is illustrated in FIG. 3 by way of example. For the vehicle 10, a front left suspension assembly 62, a front right suspension assembly 62, a rear left suspension assembly 62, and a rear right suspension assembly 62 can be similarly configured. However, alternative aspects can provide greater or lesser numbers of suspension assemblies 62.

In addition, one or more of the suspension assemblies 62 can include elements for steering, such as at the front left suspension assembly 62 and the front right suspension assembly 62 for two wheel steering, and optionally, at the rear left suspension assembly 62 and the rear suspension assembly 62 for four wheel steering. Additionally or alternatively, the suspension assembly 62 could be configured as part of an axle slider (or "slidable drawer") assembly that could move back and forth into the chassis 12 to change the distance (or tread width) between wheel assemblies 14, 16 on opposing sides of the vehicle 10. In such an arrangement, front and rear wheels on given sides, such as the left front wheel assembly 14 and the left rear wheel assembly 16 can be attached to the same axle slider for alignment of rear wheels behind the front wheels.

Each suspension assembly 62 can include a swing frame assembly 70 and the actuator 64, such as a cylinder 74 or any other practicable device, which is configured to move a suspension assembly 62 between a first position and a second position through the actuation of the actuator 64. The cylinder 74 could be a single or dual action cylinder that is responsive to a fluid in a control volume, such as an oil (hydraulic) or gas (pneumatic). The cylinder 74 can include a piston rod 76 configured to extend and retract with respect to a base 78. The swing frame assembly 70 can connect to the vehicle 10 at a pivot point 80 which could be on the chassis 12. The swing frame assembly 70 can also connect to one or more wheel assemblies 14, 16, with tires 82 mounted thereon, at a hub point 84 (or multiple wheels, including for driving a continuous band of treads or track plates). The cylinder 74 can be operationally coupled to the agricultural machine at a cylinder point 86 which could also be on the chassis 12. The cylinder 74 can also be operationally coupled to the swing frame assembly 70 at an actuation point 87 distal from the pivot point 80. This arrangement allows action of the cylinder 74 proximate to the actuation point 87 to cause the swing frame assembly 70 to pivot at the pivot point 80. Connections between the swing frame assembly 70 and the pivot point 80, the swing frame assembly 70 and the hub point 84, the cylinder 74 and the cylinder point 86, and/or the cylinder 74 and the actuation point 87, could be made, for example, by pins secured through holes in the swing frame assembly 70 and/or the cylinder 74 and corresponding channels in the chassis 12 and/or the wheel assemblies 14, 16, and including mounting brackets in certain instances. In some examples, the base 78 of each cylinder 74 can be operationally coupled at the cylinder point 86, and the piston rod 76 of each cylinder 74 can be operationally coupled at the actuation point 87, as shown in FIG. 3. However, in another aspect, the base 78 of each cylinder 74 can be operationally coupled at the actuation point 87, and the piston rod 76 of each cylinder 74 can be operationally coupled at the cylinder point 86.

Accordingly, a position of the piston rod 76 with respect to the base 78 (indicated by stroke "S") can configure a relative suspension height (indicated by "HS") for the suspension assembly 62. In operation, with the cylinder 74 being a dual action cylinder, the piston rod 76 can be set to a default stroke length and can extend and retract from the default stroke length with the motion of the vehicle 10 over terrain, which may serve to dampen and control the pivot motion of the swing frame assembly 70.

Several parameters of the suspension assembly 62 can be predetermined and stored in a suspension control system 120 (FIG. 5) for calculating the suspension height (HS). Such predetermined parameters can include: a distance between the pivot point 80 and the hub point 84 (indicated by "D"); a distance between the pivot point 80 and the cylinder point 86 (indicated by "F"); a distance between the pivot point 80 and the actuation point 87 (indicated by "A"); a vertical distance between the pivot point 80 and a lowermost central area of the chassis 12 (or belly pan) which provides clearance for the vehicle 10 over crops and the ground surface 20 below (indicated by "HBP"); a length of the cylinder 74 when the piston rod 76 is completely retracted or collapsed (indicated by "HCmThr"); and a length of the piston rod 76 when completely extended from the cylinder 74 (where a stroke "S" of the piston rod 76 becomes "HCmAx"). From the predetermined parameters, additional parameters can be derived, including an arm-to-cylinder angle between a first line through the cylinder point 86 and the actuation point 87 and a second line through the actuation point 87 and the pivot point 80 (indicated by the angle "ac"); and a wheel-to-arm angle between a third line through the hub point 84 and the pivot point 80 and a fourth line horizontally through hub point 84 (indicated by "tc").

In addition, a position sensor 88 can be arranged with respect to each cylinder 74. Each position sensor 88 can be configured to generate an electrical signal to the suspension control system for indicating a position of the corresponding piston rod 76 with respect to the base 78, corresponding to the stroke (S). For example, with the piston rod 76 having a length of about 8 inches, the piston rod 76 could be set to a default stroke that is a midpoint of four inches. When the piston rod 76 is completely extended, the stroke length could be eight inches, and when the piston rod 76 is completely retracted, the stroke length could be zero inches.

In addition, each tire 82 can have a static load rolling circumference (indicated by "RSL") providing a height dimension from the hub point 84 to the ground surface 20. A summation of the rolling circumference (RSL), the suspension height (HS), and the vertical distance between the pivot point 80 and the lowermost central area of the chassis 12 (HBP) can provide an overall clearance for the vehicle 10 (indicated by "C") over crops and the ground surface 20 below. The clearance (C) can be an adjustable value set by the operator.

However, the static load rolling circumference (RSL) can be reduced by varying amounts depending on the downward force or load exerted on the tire 82. For example, as additional force (including weight) is applied to the tire 82, such as by loading the tank 44 with the agricultural product 46 (FIG. 1), the tire 82 will increasingly deflect by a deflection value (indicated by "RCOR"), also known as tire squat, and the static load rolling circumference (RSL) will decrease accordingly. Conversely, as force is reduced from the tire 82, such as by emptying the tank 44 during spray operations, the tire 82 will decreasingly deflect by the deflection value (RCOR) and the static load rolling circumference (RSL) will increase. The varying deflection values (RCOR) may be specified in a look-up table or other data structure in a suspension control system comparing such tire dimensions with applied forces in a working range. The data structure can include multiple data sets unique for differing tires 82, each data set being based on the tire size, type, and the like, according to tire manufacturers. From the data structure, an accurate static load rolling circumference (RSL), reduced by a deflection value (RCOR), can be determined for each tire 82. Although a suspension system with "leading" and "trailing" arms is generally described above by way of example in FIG. 3, in other aspects, suspension systems with sliding and/or "wishbone" configurations could also be implemented. In such alternative aspects, the geometric calculations described above may differ to achieve the same result.

With further reference to FIG. 3, the vehicle 10 can also be configured to control the orientation of the chassis frame with respect to the suspension assemblies 62. In some examples, an orientation sensor 90, such as an Inertial Measurement Unit (IMU), may be configured to generate data indicative of a body's specific force, angular rate, and/or magnetic field surrounding the body, using any combination of accelerometers, gyroscopes, magnetometers, and/or any other practicable device. As shown, the orientation sensor 90 may be operably coupled with the chassis 12. In various instances, a respective orientation sensor 90 may be positioned proximate to and/or within each respective suspension assembly 62. Additionally or alternatively, one or more orientation sensors 90 may also be operably coupled with the boom assembly 40.

The orientation sensor 90 can detect, for example, orientations with respect to at least two axes, including an x-axis for detecting chassis-to-horizon slopes causing roll; and a y-axis for detecting chassis-to-horizon grades causing pitch, and/or a y-axis for detecting chassis-to horizon grades causing yaw. In various examples, the suspension control system may perform a calibration sequence that performs various movements of one or more suspension assemblies 62 and resets the one or more orientation sensors 90 once the defined movements have been completed. Additionally or alternatively, the vehicle 10 could encounter downward slopes to the left or right, or downward grades to the front or back, altering a position of the chassis 12 and/or the boom assembly 40 relative to the crops within a field and/or the ground surface 20, which may affect spray operations and/or vehicle conditions.

Figure 4:
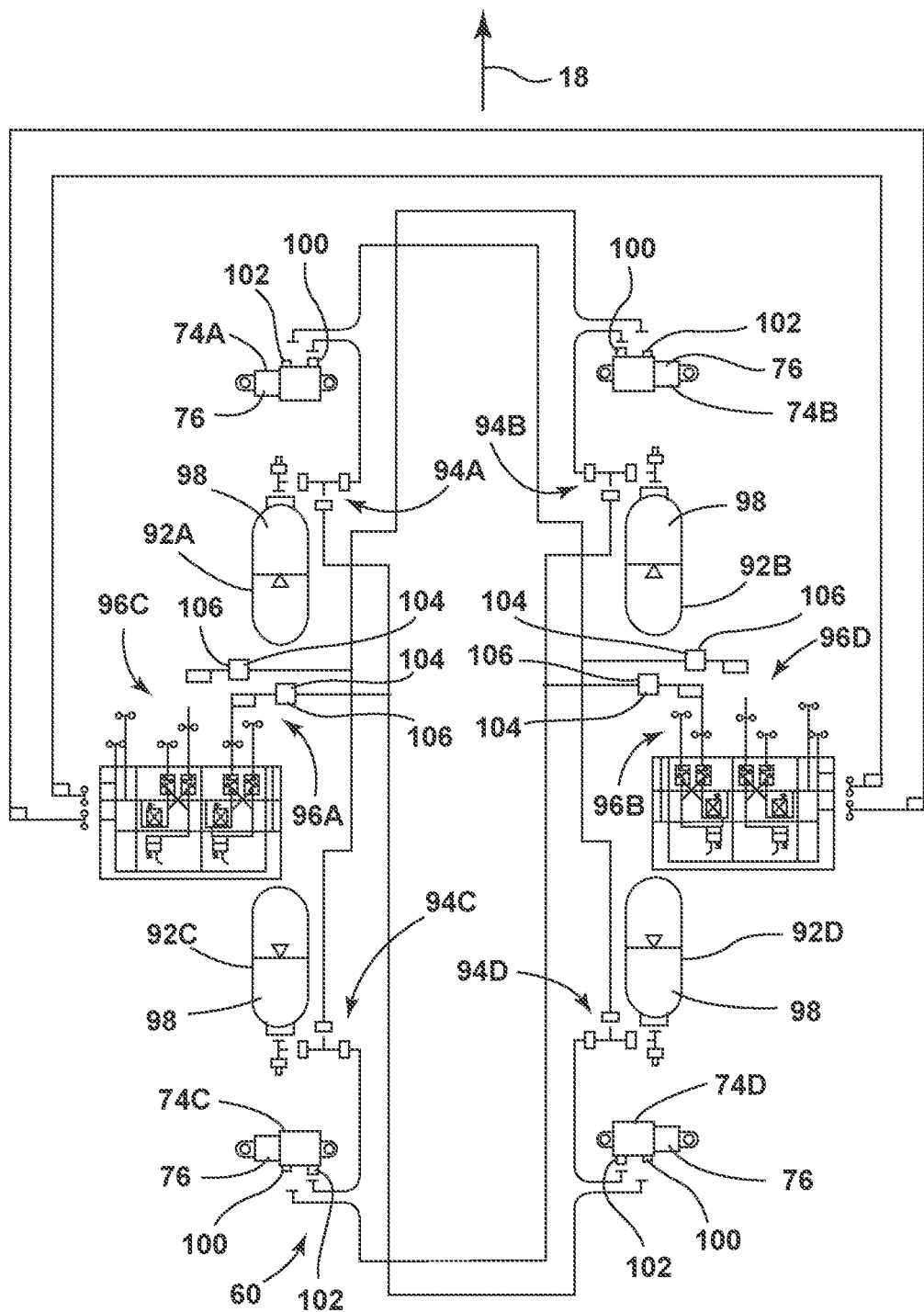
FIG. 4 illustrates a circuit diagram of the vehicle suspension system in accordance with aspects of the present subject matter.

Referring now to FIG. 4, a schematic view of a portion of a suspension system 60 for the vehicle 10 is illustrated in accordance with various aspects of the disclosure. In particular, in similar arrangements, as noted above, the left front suspension assembly 62 can include a left front cylinder 74A, the right front suspension assembly 62 can include a right front cylinder 74B, the left rear suspension assembly 62 can include a left rear cylinder 74C, and the right rear suspension assembly 62 can include a right rear cylinder 74D. The suspension system 60 can also include one or more accumulators 92A-D, various lines, hoses, and fittings, such as T-fittings 94A-D, and electronically controlled dual valves 96A-D for controlling fluid, such as oil (hydraulic) or gas (pneumatic), stored in a reservoir, flowing to and from control volumes 98 of fluid in the system. Each accumulator 92 can have two chambers or portions separated by a diaphragm, with an incompressible fluid portion in one and a compressible gas portion in the other.

Each of the cylinders 74 can be similar to the others and operates in a similar manner. For example, each cylinder 74 can include a base port 100, a rod port 102, and a movable piston rod 76. Fluid in a control volume entering the base port 100 (and exiting the rod port 102 in a control volume) causes the piston rod 76 to extend, and fluid in the control volume entering the rod port 102 (and exiting the base port 100 in the control volume) causes the piston rod 76 to retract. Accordingly, the base port 100 of the cylinder 74 is in fluid communication through the control volume 98 with the fluid portion of a respective associated accumulator 92B via an associated T-fitting 94B. In operation, when the right front wheel assembly 14 goes over a bump, for example, the piston rod 76 retracts, causing fluid to exit the base port 100 and flow to the fluid portion of the associated accumulator 92B. When the vehicle 10 travels past the bump, fluid from this chamber of the accumulator 92B flows back into the base port 100 causing the piston rod 76 to extend to its previous position. In this manner, the accumulator can operate as a spring, and the resistance of fluid in the interconnecting lines essentially operates as a damper or shock absorber.

The valves 96 control the amount of fluid in the associated accumulator 92 such that a defined neutral position (e.g., approximately the mid-stroke position) of the piston rod 76 in each of the cylinders 74 can be achieved based on the load of the vehicle 10. In this manner, each piston rod 76 is movable a sufficient amount in each direction to achieve a pivot motion of the swing frame assemblies 70, and desired vehicle height can be achieved for the vehicle 10.

The suspension system 60 can also cross-connect the independent suspension assemblies 62. In particular, the cylinder 74 of each suspension assembly 62 is in fluid communication with a cylinder 74 of a diagonally opposing suspension assembly 62. These interconnections are cross-piped in this manner such that when cylinders 74A or 74B in one assembly move to an extended or a retracted position (due to irregularities in the terrain or forces associated with the vehicle 10 turning), then the associated cylinder 74D or 74C, respectively, in the diagonally opposite assembly can also be urged to the same extended or retracted position. Likewise, if the cylinder 74D or 74C is forced to an extended or a retracted position, then the associated cylinder 74A or 74B, respectively, in the diagonally opposite assembly can be urged to the same extended or retracted position. This cross action of the cylinders 74 can help to maintain vehicle 10 in a stable horizontal orientation, such that the chassis 12 remains level, and approximately constant weight distribution to all four wheels is maintained.

In addition, a pressure sensor 104 can be arranged with respect to each control volume 98. Each pressure sensor 104 can be configured to generate an electrical signal to the suspension control system for indicating a pressure of a corresponding control volume 98. In some examples, the pressure sensors 104 could be arranged as fittings in line with the valves 96. Similarly, an optional temperature sensor 106 can be arranged with respect to each control volume 98. Each temperature sensor 106 when configured can generate an electrical signal to the suspension control system for indicating a temperature of a corresponding control volume 98. In various examples, the temperature sensors 106 could be arranged as fittings in line with the valves 96.

Figure 5:
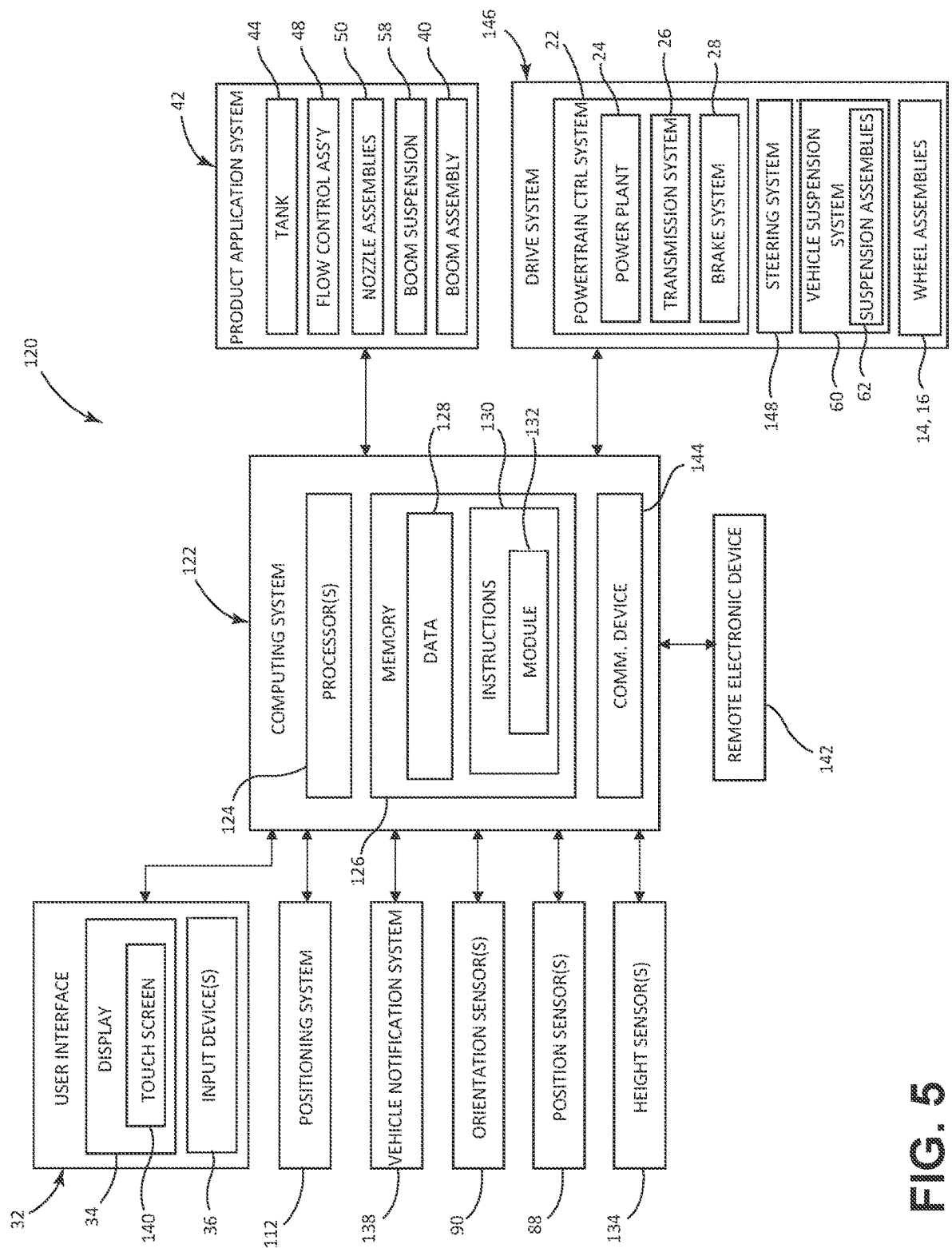
FIG. 5 illustrates a block diagram of components of an agricultural system in accordance with aspects of the present subject matter.

Referring now to FIG. 5, a schematic view of a system 120 for a work vehicle 10 is illustrated in accordance with aspects of the present subject matter. In general, the system 120 will be described with reference to the work vehicle 10 described above with reference to FIGS. 1-4. However, it will be appreciated by those of ordinary skill in the art that the disclosed system 120 may generally be utilized with agricultural machines having any other suitable machine configuration. Additionally, it will be appreciated that, for purposes of illustration, communicative links, or electrical couplings of the system 120 shown in FIG. 4 are indicated by bidirectional arrows.

In several examples, the system 120 may include a computing system 122 and various components, features, systems, and/or sub-systems configured to be communicatively coupled to the computing system 122. In general, the computing system 122 may be configured to perform various computer-related functions or tasks, including, for example, receiving data from one or more components, features, systems, and/or sub-systems of the vehicle 10, storing and/or processing data received or generated by the computing system 122, and/or controlling the operation of one or more components, features, systems and/or sub-systems of the vehicle 10.

In general, the computing system 122 may correspond to any suitable processor-based device(s), such as a computing device or any combination of computing devices. Thus, as shown in FIG. 5, the computing system 122 may generally include one or more processor(s) 124 and associated memory devices 126 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 126 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 126 may generally be configured to store information accessible to the processor(s) 124, including data 128 that can be retrieved, manipulated, created, and/or stored by the processor(s) 124 and instructions 130 that can be executed by the processor(s) 124.

In several examples, the data 128 may be stored in one or more databases. For example, the memory device 126 may include various databases for storing data associated with the operation of the vehicle 10, such as operation data, sensor data, ground surface data, map data, application data, agricultural product data, correlation tables, and/or the like. Such data may include, for example, information received from one or more components, features, systems, and/or sub-systems of the vehicle 10. For instance, as shown in FIG. 5, the computing system 122 may be communicatively coupled with one or more orientation sensors 90. As provided herein, the one or more orientation sensors 90 may be configured to generate data indicative of a body's specific force, angular rate, the magnetic field surrounding the body, and/or any other data that may be used to calculate an orientation of the chassis 12, the suspension assembly 62, the boom assembly 40, and/or the vehicle 10 using any combination of accelerometers, gyroscopes, magnetometers, and/or any other practicable device.

Additionally or alternatively, a position sensor 88 can be arranged with respect to each cylinder 74 (FIG. 3) of each suspension assembly 62. Each position sensor 88 can be configured to generate data that is transmitted to the suspension control system for indicating a position of the corresponding piston rod 76 with respect to the base 78, corresponding to the stroke (S).

Additionally or alternatively, the computing system 122 may be communicatively coupled with one or more height sensors 134. The one or more height sensors 134 may be configured to generate data indicative of a position of the chassis 12, the suspension assembly 62, the boom assembly 40, and/or the vehicle 10 relative to the ground surface 20. In various examples, the height sensor 134 may be configured as an inertial measurement unit (IMU) that measures a specific force, angular rate, and/or an orientation of the chassis 12, the suspension assembly 62, the boom assembly 40, and/or the vehicle 10 using a combination of accelerometers, gyroscopes, magnetometers, and/or any other practicable device. The one or more height sensors 134 may additionally or alternatively correspond to an image sensor. In various examples, the image sensors may correspond to a stereographic camera having two or more lenses with a separate image sensor for each lens to allow the camera to capture stereographic or three-dimensional images. In alternative examples, the image sensors may correspond to any other suitable sensing devices configured to capture image or image-like data, such as a monocular camera, a LIDAR sensor, a RADAR sensor, and/or any other sensor. Further, the one or more height sensors 134 may be configured as a proximity sensor and/or any other sensor type without departing from the teachings provided herein.

With further reference to FIG. 5, the computing system 122 may be communicatively coupled to a positioning system(s) 136 that is configured to determine the location of the vehicle 10 by using a global positioning system, a Galileo positioning system, the Global Navigation satellite system (GLONASS), the BeiDou Satellite Navigation and Positioning system, a dead reckoning system, and/or the like. In such examples, the location determined by the positioning system(s) 136 may be transmitted to the computing system 122 (e.g., in the form of location coordinates) and subsequently stored within a suitable database for subsequent processing and/or analysis.

Referring still to FIG. 5, in several examples, the instructions 130 stored within the memory device 126 of the computing system 122 may be executed by the processor(s) 124 to implement one or more modules 132, such as a data analysis module or an active control module. For example, a data analysis module may be executed or implemented by processor(s) 124 to analyze data received from one or more components, features, systems, and/or sub-systems of the vehicle 10 (e.g., the one or more orientation sensors 90, the one or more position sensors 88, the one or more height sensors 134, etc.).

Additionally, an active control module may be executed or implemented by the processor(s) 124 to alter or adjust the operation of one or more components, features, systems, and/or sub-systems of the vehicle 10. For instance, in some examples, the computing system 122 may utilize the active control module to adjust or control the operation of one or more components of an agricultural product application system 42, such as by controlling the operation of an associated flow control assembly 48 (e.g., one or more pumps, valves, and/or the like) that regulates the supply of agricultural product 46 (FIG. 1) between the tanks 44 and the nozzle assemblies 50, by controlling the operation of the nozzle assemblies 50 (e.g., by controlling the nozzle valves using a pulse width modulation (PWM) technique), and/or by controlling any other suitable component of the agricultural product application system 42 (e.g., a boom suspension 58). In addition, various other components may be adjusted or controlled by the computing system 122 via execution or implementation of the active control module. For instance, the computing system 122 may be configured to adjust or control the operation of one or more components, sub-systems, or systems of a drive system 146, such as by controlling the operation of the powertrain control system 22, a steering system 148, the vehicle suspension system 60, and/or the like.

The active control module may also be capable of providing notifications and/or instructions 130 to the user interface 32, a related vehicle notification system 138 (e.g., including components configured to provide visual, auditory, or haptic feedback, such as lights, speakers vibratory components, and/or the like), and/or a remote electronic device 142. In some instances, the active control module may generate a notification for the notification system 138 when the maximum stroke length is less than a defined range, the piston position differs from the default stroke position for a defined amount of time, and/or for any other reason.

In some examples, the user interface 32 may include a display 34 having a touchscreen 140 mounted within the cab 30. The display 34 may be capable of displaying information related to the operation of the vehicle 10 and/or systems or components operably coupled with the vehicle 10. In some examples, the display 34 may include an input device in the form of circuitry within the touchscreen 140 to receive an input corresponding with a location over the display 34. Additionally, the user interface 32 may also include various other types or forms of input devices 36, such as one or more joysticks, buttons, knobs, levers, input pads, and/or any other practicable device. In various examples, an actuator 64 of a suspension system 60 may be actuated in response to a received input through a user input.

In several examples, the computing system 122 may be configured to communicate via wired and/or wireless communication with one or more remote electronic devices 142 through a communications device 144 (e.g., a transceiver). The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. The electronic device 142 may include a display for displaying information to a user. For instance, the electronic device 142 may display one or more user interfaces and may be capable of receiving remote user inputs associated with adjusting operating variables or thresholds associated with the vehicle 10. In addition, the electronic device 142 may provide feedback information, such as visual, audible, and tactile alerts, and/or allow the operator to alter or adjust one or more components, features, systems, and/or sub-systems of the vehicle 10 through the usage of the remote electronic device 142. It will be appreciated that the electronic device 142 may be any one of a variety of computing devices and may include a processor and memory. For example, the electronic device 142 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Referring still to FIG. 5, the agricultural product application system 42 may be configured to dispense a product from the tank 44 to the ground surface 20 via the various nozzle assemblies 50 spaced apart along the length of the boom assembly 40. In some examples, the flow control assembly 48 of the application system 42 can include a pump, restrictive orifices, valves, and/or the like to regulate the flow of agricultural product 46 (FIG. 1) from the tank 44 to the nozzle assemblies 50. In some cases, the computing system 122 may alter an operational condition of the flow control assembly 48, such as by regulating the flow of an agricultural product 46 (FIG. 1), based on data provided by the one or more orientation sensors 90, the one or more position sensors 88, and/or the one or more height sensors 134. For instance, the flow control assembly 48 may alter the operation of one or more nozzle assemblies 50 (or any other component) based on an orientation of the vehicle 10 and/or a height of the vehicle 10 (or the boom assembly 40) relative to the ground surface 20.

In several examples, each nozzle assembly 50 may include a spray nozzle (and an associated valve for regulating the flow rate of the agricultural product 46 (FIG. 1) through the nozzle (and, thus, the application rate of the nozzle assembly 50), thereby allowing the desired spray characteristics of the output or spray fan of the agricultural product 46 (FIG. 1) expelled from the nozzle to be achieved. In some instances, each valve may be selectively activated to direct an agricultural product 46 (FIG. 1) towards a defined target. For instance, each valve may be selectively activated to exhaust a suitable herbicide towards a detected/identified weed and/or a nutrient towards a detected/identified crop. In such instances, the data provided by the one or more orientation sensors 90, the one or more position sensors 88, and/or the one or more height sensors 134 may be used to better target the agricultural product 46 (FIG. 1) at the defined target. In such cases, an activation time of the one or more nozzle assemblies 50 is at least partially based on the height of the boom assembly 40 relative to a ground surface 20 with the chassis 12 in the default position.

In some examples, the boom suspension 58 may be configured to dampen the movement of the boom frame 52 relative to a mast, thereby providing a more stable platform for the boom assembly 40. The boom suspension 58 may allow for various damping levels based on an operator input and/or such damping levels may be automatically altered or selected by the computing system 122 (e.g., based on data received from one or more sensors). In various examples, the boom suspension 58 may be automatically adjusted based on data received from another system or sub-systems of the vehicle 10 as well. For instance, the boom suspension 58 may alter the position of the frame 52 of the boom assembly 40 relative to the mast (or any other component) based on an orientation of the vehicle 10 and/or a height of the vehicle 10 (or the boom assembly 40) relative to the ground surface 20.

In some examples, the powertrain control system 22 includes a power plant 24, a transmission system 26, and a brake system 28. The power plant 24 is configured to vary the output of the engine to control the speed of the vehicle 10. For example, the power plant 24 may vary a throttle setting of the engine, a fuel/air mixture of the engine, a timing of the engine, and/or other suitable engine parameters to control engine output. In addition, the transmission system 26 may adjust a gear selection within a transmission system 26 to control the speed of the vehicle 10. Furthermore, the brake system 28 may adjust braking force, thereby controlling the speed of the vehicle 10. While the illustrated powertrain control system 22 includes the power plant 24, the transmission system 26, and the brake system 28, it will be appreciated that alternative examples may include one or two of these systems, in any suitable combination. Further examples may include a powertrain control system 22 having other and/or additional systems to facilitate adjusting the speed of the vehicle 10.

In various examples, the vehicle suspension system 60 may alter the position of the chassis 12 relative to a rolling axis 66 (FIG. 1) of a corresponding wheel (or any other component) based on an orientation of the vehicle 10 and/or a height of the vehicle 10 (or the boom assembly 40) relative to the ground surface 20. Additionally or alternatively, at various times during operation, the vehicle suspension system 60 may alter the position of the chassis 12 relative to a rolling axis 66 (FIG. 1) of a corresponding wheel (or any other component) to calibrate each suspension assembly 62. In such instances, the computing system 122 may reset a default position of the vehicle 10 based on the data from the one or more orientation sensors 90 once the defined movements of the suspension assemblies 62 have been completed. Additionally, in some cases, the computing system 122 may recalculate a height of one or more components from the ground surface 20 once the default position is redefined by the computing system 122.

In some examples, when the positioning system(s) 136 determines that the location of the vehicle 10 is within a first location, the computing system 122 may provide instructions 130 to one or more systems of the vehicle 10 to operate in a defined state. For example, when in the defined location, the suspension control system may perform a calibration sequence that performs various movements of one or more suspension assemblies 62 and resets the one or more orientation sensors 90 once the defined movements have been completed. Additionally or alternatively, the vehicle 10 could encounter downward slopes to the left or right, or downward grades to the front or back, altering a position of the chassis 12 and/or the boom assembly 40 relative to the crops within a field and/or the ground surface 20, which may affect spray operations and/or vehicle conditions when in the defined location. As such, the suspension assembly 62 may alter a height of one or more portions of the chassis 12 in such instances.

In operation, each of the suspension assemblies 62 may be placed at a first default stoke thereby defining a first default position. At various times, the computing system 122 may instruct each of the suspension assemblies 62 to calibrate the suspension assembly 62. In such instances, the computing system 122 may instruct each suspension assembly 62 to move to a minimum height position and a maximum height position, such as by moving a piston rod 76 to a fully retracted position and a fully extended position. A position sensor 88 associated with each respective suspension assembly 62 may be configured to generate data indicative of a position of the corresponding piston rod 76 with respect to the base when the piston is moved between the minimum height position and the maximum height position, corresponding to the stroke. For example, if the position sensor 88 provides data indicating that the piston rod 76 has a movement length of about x inches, the piston rod 76 could be set to a default stroke which is a midpoint of x/2 inches.

Once each of the suspension assemblies 62 is placed at its default stroke, the computing system 122 can define a second default position of the vehicle 10 based on the data from the one or more orientation sensors 90. Additionally, in some cases, the computing system 122 may recalculate a second height of one or more components from the ground surface 20 once the second default position is defined by the computing system 122. The second height may be varied from a first height of the vehicle 10 prior to the recalibration of one or more suspension assemblies 62. For example, the computing system 122 may calculate the second height of the chassis 12 relative to one or more rolling axes and/or the ground surface 20. Additionally or alternatively, the computing system 122 may calculate a second height of the boom assembly 40 relative to the ground surface 20. One or more spraying operations may then be updated based on the second height of the vehicle 10 relative to the ground surface 20.

Figure 6:
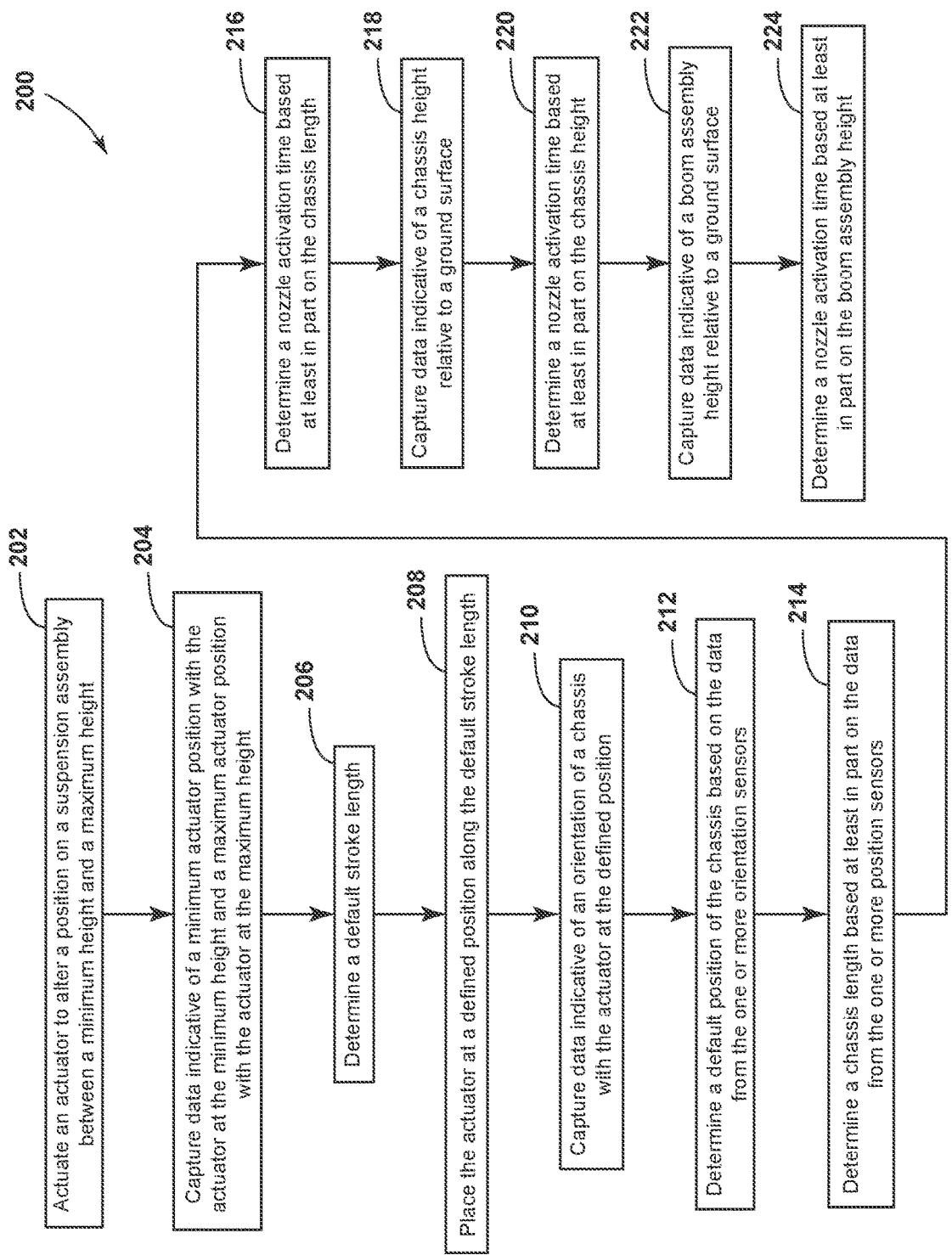
FIG. 6 illustrates a flow diagram of a method for an agricultural application operation in accordance with aspects of the present subject matter.

Referring now to FIG. 6, a flow diagram of some examples of a method 200 for operating an agricultural vehicle is illustrated in accordance with aspects of the present subject matter. In general, the method 200 will be described herein with reference to the work vehicle 10, and the system 120 described above with reference to FIGS. 1-5. However, the disclosed method 200 may generally be utilized with any suitable agricultural work vehicle 10 and/or may be utilized in connection with a system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 can include actuating an actuator to alter a position on a suspension assembly between a minimum height and a maximum height. As provided herein, each suspension assembly can include a swing frame assembly and an actuator, such as a cylinder or any other practicable device, that is configured to move a suspension assembly between a first position and a second position through the actuation of the actuator.

At (204), the method 200 can include capturing data indicative of a minimum actuator position with the actuator at the minimum height and a maximum actuator position with the actuator at the maximum height from one or more position sensors. At (206), the method 200 can include determining a default stroke with a computing system. As provided herein, the stroke length may be defined as the length upon which the actuator may move between the minimum height and the maximum height.

At (208), the method 200 can include placing the actuator at a defined position along the default stroke length with the computing system. In various examples, the defined position may be a midpoint along the default stroke length or any other position.

At (210), the method 200 can include capturing data indicative of an orientation of a chassis with the actuator at the defined position from one or more orientation sensors. At (212), the method 200 can include determining a default position of the chassis based on the data from the one or more orientation sensors with the computing system.

At (214), the method 200 can include determining, with the computing system, a chassis length based at least in part on the data from the one or more position sensors. In various examples, as the position of the actuator is altered, the length of the chassis may be altered, which may affect a distance between various components of the vehicle. As such, at (216), the method 200 can include determining a nozzle activation time based at least in part on the chassis length with the computing system.

At (218), the method 200 can include capturing data indicative of a chassis height relative to a ground surface from one or more height sensors. At (220), the method 200 can include determining a nozzle activation time based at least in part on the chassis height with the computing system. Additionally or alternatively, at (222), the method 200 can include capturing data indicative of a boom assembly height relative to a ground surface from one or more height sensors. At (224), the method 200 can include determining a nozzle activation time based at least in part on the boom assembly height with the computing system.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the vehicle learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, or a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A suspension control system comprising:
   a chassis;
   one or more wheel assemblies;
   one or more suspension assemblies respectively coupled to the one or more wheel assemblies, wherein each of the one or more suspension assemblies is moveable between a first position and a second position through actuation of an actuator;
   one or more position sensors configured to capture data indicative of a position of the actuator within each of the one or more suspension assemblies;
   one or more orientation sensors configured to capture data indicative of an orientation of the chassis; and
   a computing system communicatively coupled to the one or more position sensors and the one or more orientation sensors, the computing system being configured to:
   actuate the actuator of the one or more suspension assemblies to define a stroke;
   determine a default stroke position based on data from the one or more position sensors; and
   define a default position of the chassis based on data from the one or more orientation sensors.

2. The system of claim 1, further comprising:
   one or more height sensors,
   wherein the computing system is further configured to determine a height of the chassis relative to a ground surface with the chassis in the default position.

3. The system of claim 1, wherein the computing system is further configured to:
   generate instructions for one or more components operably coupled with the chassis based at least partially on a height of the chassis relative to a ground surface with the chassis in the default position.

4. The system of claim 1, further comprising:
   a boom assembly operably coupled with the chassis; and
   one or more height sensors,
   wherein the computing system is further configured to determine a height of the boom assembly relative to a ground surface with the chassis in the default position.

5. The system of claim 4, further comprising:
   a product application system operably coupled with the boom assembly.

6. The system of claim 5, wherein the product application system includes one or more nozzle assemblies, and wherein an activation time of the one or more nozzle assemblies is at least partially based on the height of the boom assembly relative to a ground surface with the chassis in the default position.

7. The system of claim 5, wherein the product application system includes a flow control assembly, and wherein an operational condition of the flow control assembly is at least partially based on the height of the boom assembly relative to a ground surface with the chassis in the default position.

8. The system of claim 1, wherein the one or more position sensors includes a first position sensor operably coupled with a first suspension assembly of the one or more suspension assemblies and a second position sensor operably coupled with a second suspension assembly of the one or more suspension assemblies.

9. The system of claim 1, wherein the one or more orientation sensors includes a first orientation sensor operably coupled with a first suspension assembly of the one or more suspension assemblies and a second orientation sensor operably coupled with a second suspension assembly of the one or more suspension assemblies.

10. The system of claim 9, wherein the computing system is further configured to:
    determine a chassis length based on the data provided by at least one of the one or more position sensors or one or more orientation sensors.

11. A method for an operating an agricultural vehicle, the method comprising:
    actuating an actuator to alter a position on a suspension assembly between a minimum height and a maximum height;
    capturing data, from one or more position sensors, indicative of a minimum actuator position with the actuator at the minimum height and a maximum actuator position with the actuator at the maximum height;
    determining, with a computing system, a default stroke length;
    placing the actuator at a defined position along the default stroke length;
    capturing data, from one or more orientation sensors, indicative of an orientation of a chassis with the actuator at the defined position; and
    determining, with the computing system, a default position of the chassis based on the data from the one or more orientation sensors.

12. The method of claim 11, further comprising:
    determining, with the computing system, a chassis length based at least in part on the data from the one or more position sensors.

13. The method of claim 12, further comprising:
    determining, with the computing system, a nozzle activation time based at least in part on the chassis length.

14. The method of claim 11, further comprising:
capturing data, from one or more height sensors, indicative of a chassis height relative to a ground surface; and
determining, with the computing system, a nozzle activation time based at least in part on the chassis height.

15. The method of claim 11, further comprising:
capturing data, from one or more height sensors, indicative of a boom assembly height relative to a ground surface; and
determining, with the computing system, a nozzle activation time based at least in part on the boom assembly height.

16. A suspension control system comprising:
a chassis;
one or more wheel assemblies;
one or more suspension assemblies respectively coupled to the one or more wheel assemblies, wherein each of the one or more suspension assemblies is moveable between a first position and a second position through actuation of an actuator;
one or more position sensors configured to capture data indicative of a position of the actuator within each of the one or more suspension assemblies;
one or more height sensors configured to capture data indicative of a height of the chassis; and
a computing system communicatively coupled to the one or more position sensors and the one or more height sensors, the computing system being configured to:
actuate the actuator of the one or more suspension assemblies to define a stroke;
determine a default stroke position based on data from the one or more position sensors; and
determine a height of the chassis relative to a ground surface with the chassis in the default position.

17. The system of claim 16, further comprising:
one or more orientation sensors configured to capture data indicative of an orientation of the chassis,
wherein the computing system is further configured to define a default position of the chassis based on data from the one or more orientation sensors.

18. The system of claim 16, further comprising:
a boom assembly operably coupled with the chassis,
wherein the computing system is further configured to determine a height of the boom assembly relative to a ground surface with the chassis in the default position.

19. The system of claim 18, further comprising:
a product application system including one or more nozzle assemblies operably coupled with the boom assembly,
wherein an activation time of the one or more nozzle assemblies is at least partially based on the height of the boom assembly relative to a ground surface with the chassis in the default position.

20. The system of claim 16, wherein the actuator is actuated in response to a received input through a user input.

* * * * *